United States Patent
Bhardwaj et al.

(10) Patent No.: US 8,617,734 B2
(45) Date of Patent: Dec. 31, 2013

(54) PRESSURE-RELIEF MECHANISM TO IMPROVE SAFETY IN LITHIUM-POLYMER BATTERY CELLS

(71) Applicant: Apple Inc., Cupertino, CA (US)

(72) Inventors: Ramesh C. Bhardwaj, Fremont, CA (US); Taisup Hwang, Santa Clara, CA (US); Richard M. Mank, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/722,734

(22) Filed: Dec. 20, 2012

(65) Prior Publication Data

US 2013/0115491 A1 May 9, 2013

Related U.S. Application Data (62) Division of application No. 12/622,788, filed on Nov. 20, 2009, now abandoned.

(51) Int. Cl.
*H01M 2/12* (2006.01)

(52) U.S. Cl.
USPC .................................. 429/82; 429/53; 429/56

(58) Field of Classification Search
USPC ................................................ 429/56, 82, 53
See application file for complete search history.

(56) References Cited

U.S. PATENT DOCUMENTS

| 7,413,829 | B2 | 8/2008 | Suzuki et al. | |
| 2006/0051658 | A1* | 3/2006 | Otohata et al. | 429/53 |
| 2007/0122714 | A1* | 5/2007 | Suzuki et al. | 429/232 |
| 2009/0053585 | A1 | 2/2009 | Nakazawa | |

FOREIGN PATENT DOCUMENTS

WO    WO 2007043392 A1 *  4/2007

* cited by examiner

*Primary Examiner* — Eugenia Wang
(74) *Attorney, Agent, or Firm* — Park, Vaughan, Fleming & Dowler LLP; Anthony P. Jones (57) ABSTRACT

The disclosed embodiments relate to a battery cell which includes a weakness for relieving pressure. This battery cell includes a jelly roll comprising layers which are wound together, including a cathode with an active coating, a separator and an anode with an active coating. The jelly roll also includes a first conductive tab coupled to the cathode and a second conductive tab coupled to the anode. The jelly roll is enclosed in a flexible pouch, wherein the first and second conductive tabs extend through seals in the pouch to provide terminals for the battery cell. This pouch includes a weakness which yields when internal pressure in the pouch exceeds a threshold to create a hole which releases the internal pressure.

12 Claims, 7 Drawing Sheets

PRESSURE-RELIEF MECHANISM TO IMPROVE SAFETY IN LITHIUM-POLYMER BATTERY CELLS

RELATED CASES

The instant application is a divisional of, and hereby claims priority under 35 U.S.C. §120 to, now-abandoned U.S. patent application Ser. No. 12/622,788, which is titled "Pressure-Relief Mechanism to Improve Safety in Lithium-Polymer Battery Cells," by Ramesh C. Bhardwaj, Taisup Hwang and Richard M. Monk, which was filed on 20 Nov. 2009, and which is herein incorporated by reference.

BACKGROUND

1. Field

The disclosed embodiments relate to techniques for improving safety in rechargeable lithium-polymer battery cells. More specifically, the disclosed embodiments relate to the design of a pressure-relief mechanism which improves the safety in lithium-polymer battery cells.

2. Related Art

Rechargeable batteries are presently used to provide power to a wide variety of portable electronic devices, including laptop computers, cell phones, PDAs, digital music players and cordless power tools. The most commonly used type of rechargeable battery is a lithium battery, which can include a lithium-ion or a lithium-polymer battery.

A potential safety issue can arise if there is a gas buildup within a rechargeable lithium battery cell. This can occur, for example, if the cell is overcharged, if there is a short within the cell, or if the cell is left uncharged for a significant period of time. This type of gas buildup can potentially cause the battery cell to swell or even to explode, which can seriously damage the portable electronic device, and may even start a fire.

To alleviate this problem, cylindrical lithium-ion battery cells are often equipped with a vent valve to release the internal pressure in the battery cell when a gas buildup occurs. However, there exist no comparable pressure-relief mechanisms for lithium-polymer batteries, which are becoming increasingly popular in portable electronic devices. A lithium-polymer battery is typically enclosed in a flexible pouch, which is lightweight and inexpensive to manufacture. However, no pressure-relief mechanism has been developed for these pouches so far.

SUMMARY

The disclosed embodiments relate to a battery cell which includes a weakness for relieving pressure. This battery cell includes a jelly roll comprising layers which are wound together, including a cathode with an active coating, a separator, and an anode with an active coating. The jelly roll also includes a first conductive tab coupled to the cathode and a second conductive tab coupled to the anode. The jelly roll is enclosed in a flexible pouch, wherein the first and second conductive tabs extend through seals in the pouch to provide terminals for the battery cell. This pouch includes a weakness which yields when internal pressure in the pouch exceeds a threshold to create a hole which releases the internal pressure.

In some embodiments, the pouch includes multiple weaknesses at different locations on the pouch.

In some embodiments, the weakness can include: a V-shaped notch cut into a seal for the pouch; a half-circle cut into a seal for the pouch; a pattern of tiny holes formed in a seal for the pouch; and a thinned region of the pouch material.

In some embodiments, the weakness can be located on: a side seal for the pouch; a terrace seal for the pouch; a corner of the pouch; a fold in the pouch material; and a location on a surface of the pouch which is not part of a seal.

In some embodiments, the pouch is comprised of a layer of aluminum and a layer of polypropylene.

In some embodiments, the battery cell is a lithium-polymer battery cell, or a silver-zinc battery cell.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Battery Cell

Figure 1:
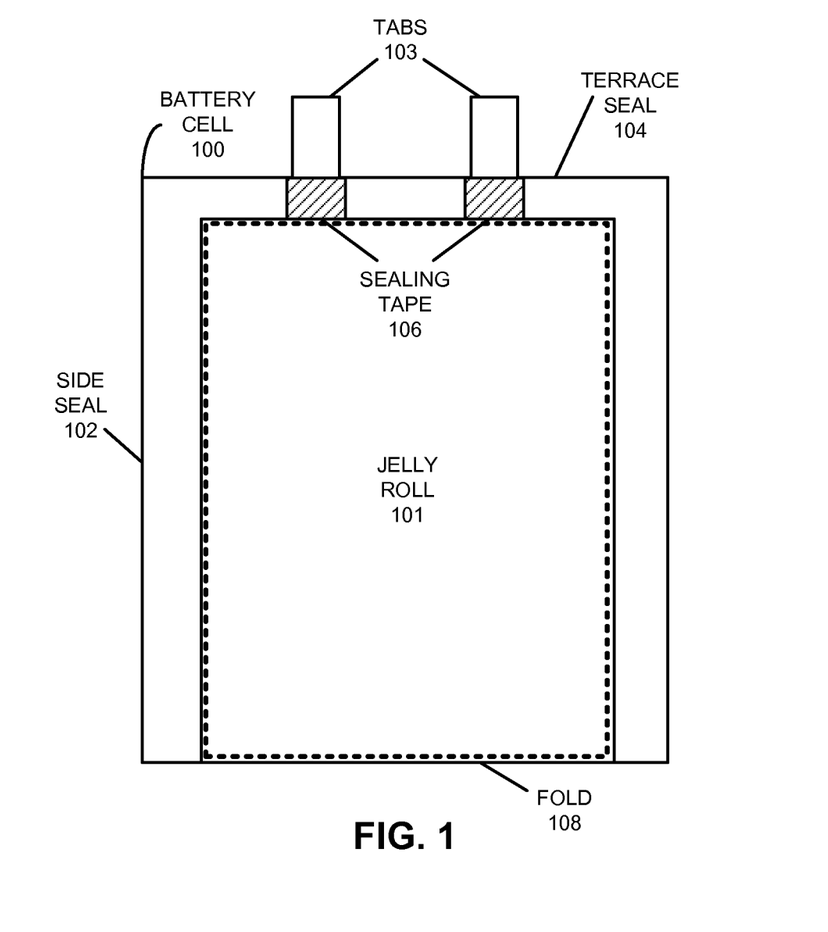
FIG. 1 illustrates a battery cell in accordance with the disclosed embodiments.

FIG. 1 illustrates a battery cell 100 in accordance with the disclosed embodiments. Battery cell 100 includes a jelly roll 101 comprising a number of layers which are wound together, including a cathode with an active coating, a separator, and an anode with an active coating. Jelly rolls are well known in the art and will not be described further. During assembly of battery cell 100, jelly roll 101 is enclosed in a flexible pouch, which is formed by folding a flexible sheet along a fold line 108. For example, the flexible sheet can be comprised of aluminum with a polymer film, such as polypropylene. After the flexible sheet is folded, the flexible sheet can be sealed, for example by applying heat along side seals 102 and along a terrace seal 104.

Note that jelly roll 101 includes conductive tabs 103 coupled to the cathode and the anode. These conductive tabs 103 extend through seals in the pouch (for example, formed using sealing tape 106) to provide terminals for battery cell 100.

Also note that a battery pack can be formed by coupling together a number of such battery cells: in series, in parallel, or both in series and in parallel. The coupled cells can then be enclosed in a hard case.

Battery Cell Including a Weakness

As mentioned above, a gas buildup can potentially occur within battery cell 100 if: battery cell 100 is overcharged; there is a short within battery cell 100; or battery cell 100 is left uncharged for a significant period of time. This gas buildup can potentially cause the battery cell to swell or even explode. To deal with this problem, the pouch includes one or more preformed weaknesses which yield when internal pressure in the pouch exceeds a threshold value to create a hole which releases the internal pressure.

Figure 2:
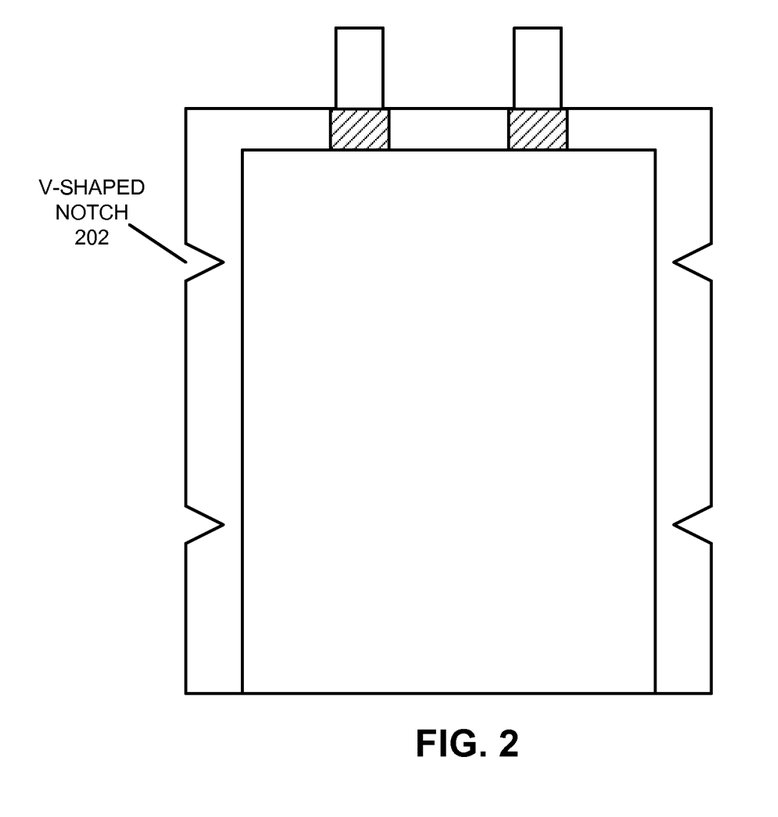
FIG. 2 illustrates a battery cell with V-shaped notches cut into seals for a pouch in accordance with the disclosed embodiments.
Figure 3:
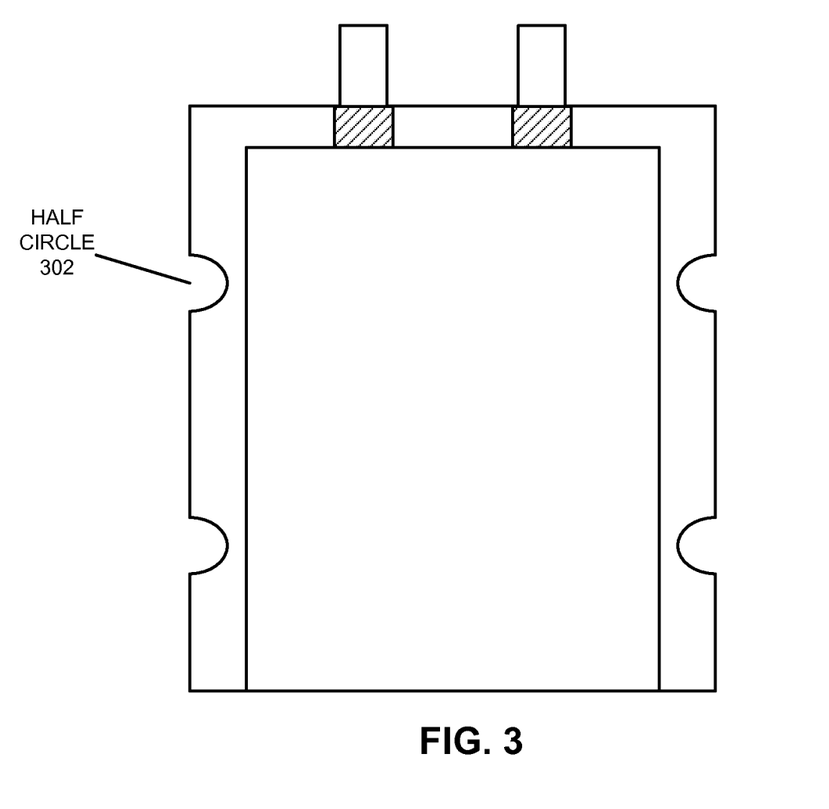
FIG. 3 illustrates a battery cell with half-circles cut into seals for a pouch in accordance with the disclosed embodiments.
Figure 4:
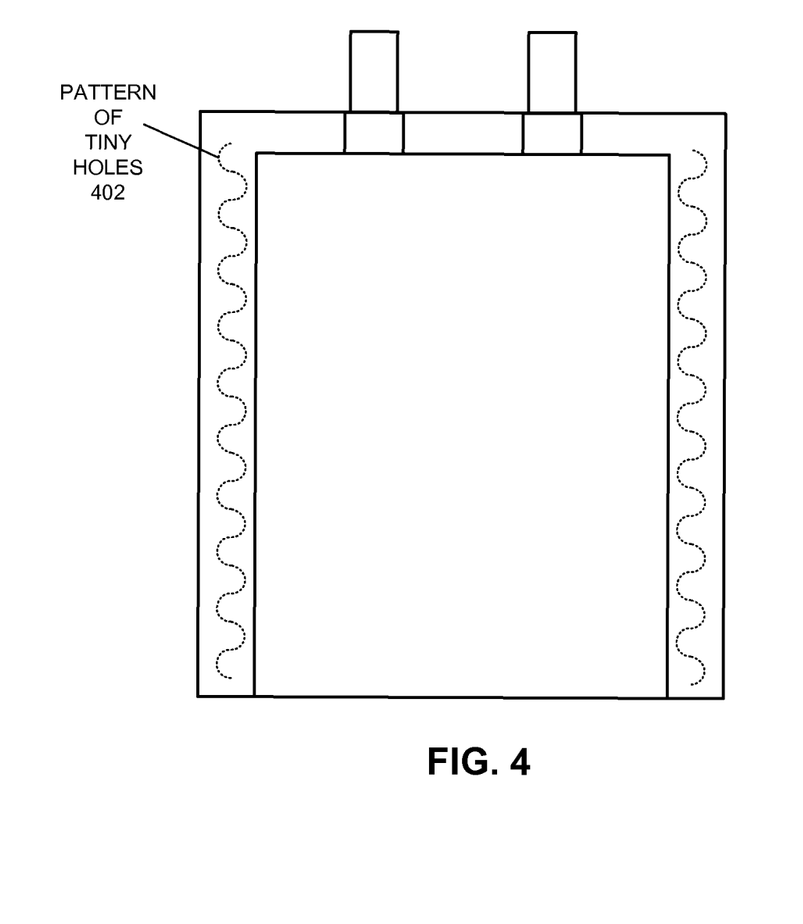
FIG. 4 illustrates a battery cell with patterns of tiny holes formed in a seal for a pouch in accordance with the disclosed embodiments.

There are a number of different ways to create such a weakness. For example, a number of V-shaped notches, including V-shaped notch 202, can be cut into the seals for the pouch as is illustrated in FIG. 2. These V-shaped notches can be cut using some type of cutting tool after the pouch is formed. Alternatively, a number half-circles, including half-circle 302, can be cut into the seals for the pouch as is illustrated in FIG. 3. In yet another embodiment which is illustrated in FIG. 4, instead of cutting notches in the seals, weaknesses can be created by forming a pattern of tiny holes 402 in the seals. Note that "tiny" as used herein indicates a hole size that is of a given proportion to a side seal of the pouch. An example of a proportion of the holes to the side seal is illustrated in FIG. 4.

Figure 5:
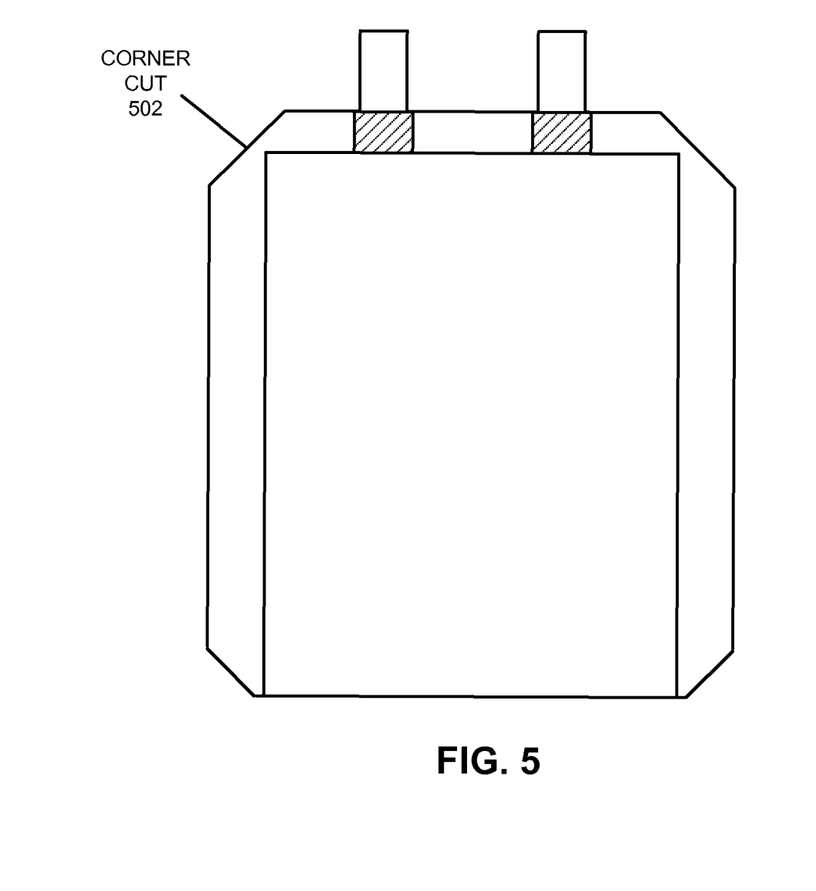
FIG. 5 illustrates a battery cell including a pouch with corner cuts in accordance with the disclosed embodiments.
Figure 6:
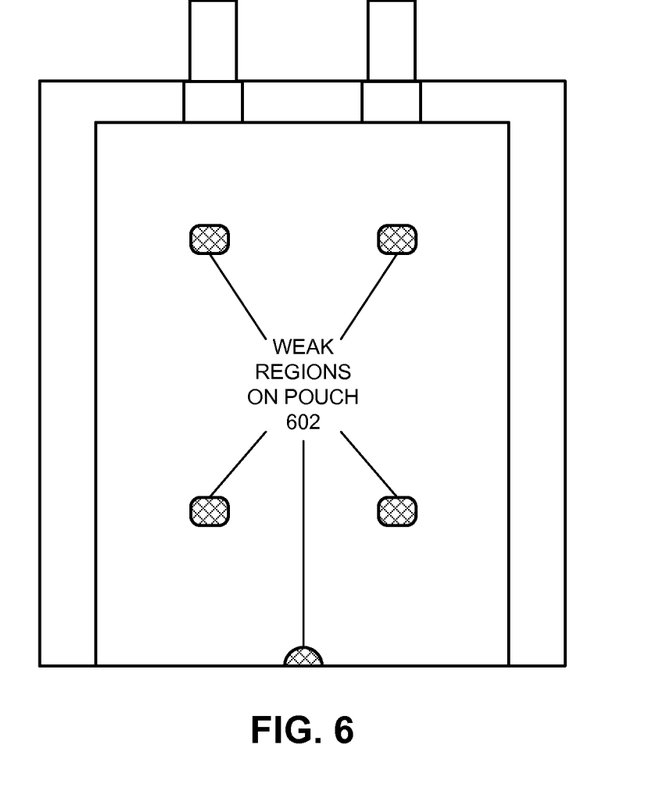
FIG. 6 illustrates a battery cell with weak regions formed in the pouch material in accordance with the disclosed embodiments.

Weaknesses can also be formed at other locations on the battery cell pouch. For example, FIG. 5 illustrates a battery cell having a pouch with weaknesses which are formed as corner cuts 502. Alternatively, FIG. 6 illustrates a battery cell with weak regions 602 which are formed at various locations on the pouch material. These weak regions 602 can be formed, for example, by thinning the pouch material.

In general, such weaknesses can be formed at any location on the battery pouch, including at: a side seal for the pouch; a terrace seal for the pouch; a corner of the pouch; a fold in the pouch material; and any location on a surface of the pouch which is not part of a seal. Moreover, although a number of different types of weaknesses are illustrated in FIGS. 2-6, in general any type of weakness which yields to internal pressure in the battery cell can be used by the disclosed embodiments.

Computing Device

Figure 7:
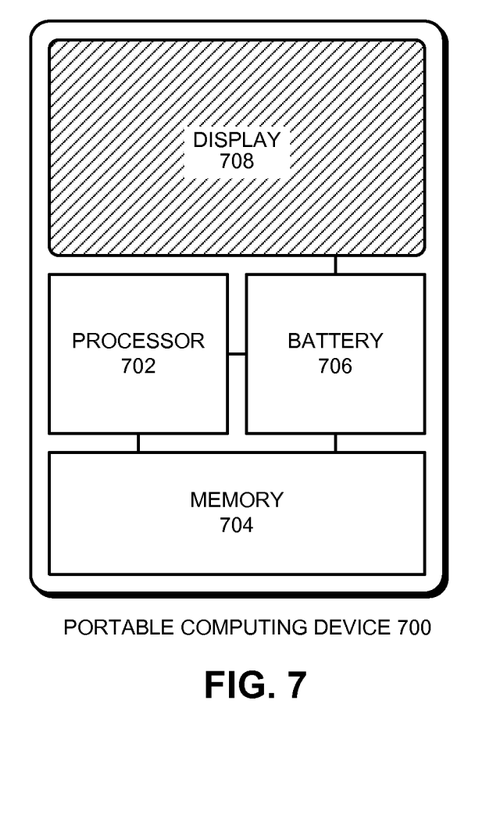
FIG. 7 illustrates a portable computing device in accordance with the disclosed embodiments.

The above-described rechargeable battery cell can generally be used in any type of electronic device. For example, FIG. 7 illustrates a portable computing device 700 which includes a processor 702, a memory 704 and a display 708, which are all powered by a battery 706. Battery 706 comprises a battery pack, which includes multiple battery cells that are coupled together in series and/or in parallel.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A battery cell with a weakness for relieving pressure, comprising:
 a jelly roll comprising layers which are wound together, including a cathode with a first active coating, a separator, and an anode with a second active coating;
 a pouch, which encloses the jelly roll, wherein the pouch is flexible;
 a first conductive tab coupled to the cathode; and
 a second conductive tab coupled to the anode;
 wherein the first and second conductive tabs extend through seals in the pouch to provide terminals for the battery cell; and
 wherein the pouch includes the weakness which yields when internal pressure in the pouch exceeds a threshold to create a hole which releases the internal pressure, the weakness including a wave pattern of tiny holes that extends from a first end to a second end of a predetermined portion of a seal for the pouch, the predetermined portion located on at least one side of the pouch through which the conductive tabs do not extend.

2. The battery cell of claim 1, wherein the pouch includes multiple weaknesses at different locations on the pouch.

3. The battery cell of claim 1, wherein the pouch is comprised of:
 a layer of aluminum; and
 a layer of polypropylene.

4. The battery cell of claim 1, wherein the battery cell is one of:
 a lithium-polymer battery cell; and
 a silver-zinc battery cell.

5. A battery pack comprising one or more battery cells coupled together and enclosed in a hard case, wherein each of the one or more battery cells includes:
 a jelly roll comprising layers which are wound together, including a cathode with a first active coating, a separator, and an anode with a second active coating;
 a pouch, which encloses the jelly roll, wherein the pouch is flexible;
 a first conductive tab coupled to the cathode; and
 a second conductive tab coupled to the anode;
 wherein the first and second conductive tabs extend through seals in the pouch to provide terminals for the battery cell; and
 wherein the pouch includes a weakness which yields when internal pressure in the pouch exceeds a threshold to create a hole which releases the internal pressure, the weakness including a wave pattern of tiny holes that extends from a first end to a second end of a predetermined portion of a seal for the pouch, the predetermined portion located on at least one side of the pouch through which the conductive tabs do not extend.

6. The battery pack of claim 5, wherein the one or more battery cells are coupled together:
   in series;
   in parallel; or
   in series and parallel.

7. The battery pack of claim 5, wherein the pouch is comprised of:
   a layer of aluminum; and
   a layer of polypropylene.

8. The battery pack of claim 5, wherein each battery cell is one of:
   a lithium-polymer battery cell; and
   a silver-zinc battery cell.

9. A method for assembling a battery cell, comprising:
   obtaining a jelly roll comprising layers which are wound together, including a cathode with a first active coating, a separator, and an anode with a second active coating, wherein the jelly roll includes a first conductive tab coupled to the cathode and a second conductive tab coupled to the anode;
   obtaining a pouch to accommodate the jelly roll, wherein the pouch is flexible;
   sealing the jelly roll in the pouch, wherein the pouch is sealed so that the first and second conductive tabs extend through seals in the pouch to provide terminals for the battery cell; and
   creating a weakness in the pouch, the weakness including a wave pattern of tiny holes that extends from a first end to a second end of a predetermined portion of a seal for the pouch, the predetermined portion located on at least one side of the pouch through which the conductive tabs do not extend, and the weaknesses configured to yield when internal pressure in the pouch exceeds a threshold to create a hole which releases the internal pressure.

10. The method of claim 9, wherein the weakness in the pouch is created:
    prior to sealing the jelly roll in the pouch; or
    after sealing the jelly roll in the pouch.

11. The method of claim 9, wherein the pouch is comprised of:
    a layer of aluminum; and
    a layer of polypropylene.

12. The method of claim 9, wherein the battery cell is one of:
    a lithium-polymer battery cell; and
    a silver-zinc battery cell.

* * * * *